United States Patent
Isken, II et al.

(10) Patent No.: US 8,454,471 B2
(45) Date of Patent: Jun. 4, 2013

(54) ELECTRONIC LOCKING DIFFERENTIAL

(75) Inventors: Dennis W. Isken, II, Frankenmuth, MI (US); Hihong Guo, Ann Arbor, MI (US); Brian J. Andonian, Plymouth, MI (US); Jacob M. Povirk, Franklin, MI (US); Yasser Hindi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 470 days.

(21) Appl. No.: 12/840,338

(22) Filed: Jul. 21, 2010

(65) Prior Publication Data

US 2012/0021862 A1    Jan. 26, 2012

(51) Int. Cl.
*F16H 48/24* (2006.01)
*F16H 48/30* (2012.01)
*F16H 48/08* (2006.01)
*F16D 27/09* (2006.01)

(52) U.S. Cl.
USPC .................. 475/231; 475/150; 192/84.92

(58) Field of Classification Search
USPC ........ 475/231, 235, 237, 240, 150; 192/84.92
See application file for complete search history.

(56) References Cited

U.S. PATENT DOCUMENTS

| | | | | |
|---|---|---|---|---|
| 1,193,017 A | * | 8/1916 | Higinbotham | 475/237 |
| 1,723,901 A | * | 8/1929 | Todd | 475/237 |
| 2,459,870 A | | 1/1949 | Cook | |
| 4,526,063 A | * | 7/1985 | Oster | 475/237 |
| 4,838,118 A | | 6/1989 | Binkley | |
| 4,976,667 A | | 12/1990 | Goscenski, Jr. | |
| 6,007,449 A | * | 12/1999 | Okada et al. | 475/231 |
| 6,083,134 A | * | 7/2000 | Godlew | 475/231 |
| 6,165,095 A | * | 12/2000 | Till et al. | 475/150 |
| 6,533,699 B1 | * | 3/2003 | Fett | 475/231 |
| 6,551,209 B2 | * | 4/2003 | Cheadle et al. | 475/150 |
| 6,835,155 B2 | | 12/2004 | Busch et al. | |
| 6,991,572 B2 | | 1/2006 | Chung | |
| 7,048,668 B2 | | 5/2006 | Busch et al. | |
| 7,137,921 B2 | * | 11/2006 | DeGowske | 475/231 |
| 7,399,248 B2 | * | 7/2008 | Kleinhans et al. | 475/235 |
| 7,600,599 B1 | * | 10/2009 | Dahl et al. | 180/249 |
| 8,096,913 B2 | * | 1/2012 | Allmendinger et al. | 475/231 |

* cited by examiner

*Primary Examiner* — Justin Holmes
*Assistant Examiner* — Jacob S Scott
(74) *Attorney, Agent, or Firm* — James Dottavio; MacMillan, Sobanski & Todd, LLC

(57) ABSTRACT

A differential mechanism includes a case, a gear rotatable about an axis, a lock ring held against rotation relative to the case, a lever contacting the lock ring, and an electromagnetic coil that is displaced axially when energized, pivoting the lever, engaging the lock ring with the side gear, and preventing the gear from rotating relative to the case.

18 Claims, 8 Drawing Sheets

ELECTRONIC LOCKING DIFFERENTIAL

BACKGROUND OF THE INVENTION

1. Field of the Invention

The present invention relates generally to an apparatus for alternately releasing and holding a side gear of a differential assembly against rotation relative to a case. More particularly, the invention pertains to electromagnetic actuation of a device for releasing and holding the side gear.

2. Description of the Prior Art

A locking differential is used to prevent relative rotation of one driven wheel with respect to another driven wheel. This is usually accomplished by locking one differential side gear to a differential case, thereby preventing rotation of the side gear with respect to the differential case and preventing a wheel speed differential on any one axle.

A locking differential employs hydraulic pressure or an electromagnet to actuate a mechanism that alternately holds a side gear against rotation and releases the side gear to rotate freely. Due to packaging constraints, however, certain vehicle applications require a small electromagnetic coil whose size and number of windings may not provide an engagement force of sufficient magnitude to lock the differential. In such instances, a technique is required to amplify the actuating force produce by the coil to a magnitude that is sufficient to produce reliable, axial displacement of the coil.

The actuating force produced by the coil varies non-linearly and inversely with air gap. Thus for a given coil size, the initial air gap should be kept as small as possible in order to maximize the force that actuates the differential to the locked condition.

A need exists in the industry for a locking differential actuated by a small axially displaceable electromagnetic coil having a minimum air gap such that displacement of the coil is amplified producing greater displacement for a locking mechanism that secures one of the side gears of the differential against rotation on a differential case.

SUMMARY OF THE INVENTION

A differential mechanism includes a case, a gear rotatable about an axis, a lock ring held against rotation relative to the case, a lever contacting the lock ring, and an electromagnetic coil that is displaced axially when energized, pivoting the lever, engaging the lock ring with the side gear, and preventing the gear from rotating relative to the case.

A method for locking a differential includes supporting a gear for rotation, holding a lock ring against rotation, placing a lever in contact with the lock ring, energizing an electromagnetic coil causing the lever to pivot, engaging the lock ring with the side gear, and preventing the side gear from rotating relative to the lock ring.

The locking differential employs a relatively small coil having a small copper winding, thereby reducing its weight and cost.

The locking differential amplifies displacement of the energized coil, thereby allowing the coil to move a short distance while providing a large movement for the lock ring and ensuring its full engagement with the side gear.

Due to the small coil, a small air gap produces an axial force that is able to move the coil to the engaged or locked position, thereby allowing use of a large return spring, which keeps the differential unlocked when the coil is deenergized.

The moving coil locking differential operates reliably at all normal operating temperatures in a front or rear axle differential or in a center differential, such as those used in 4×4 and AWD vehicles.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
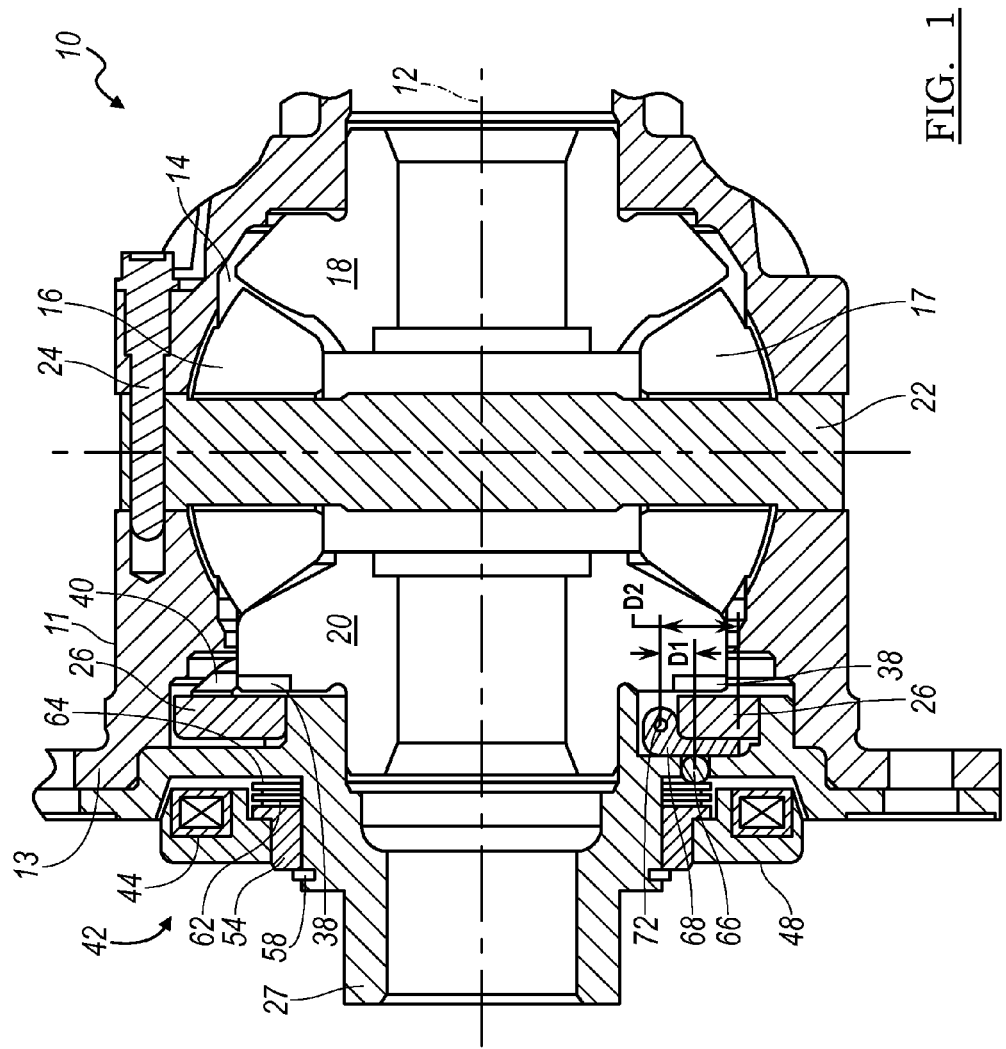
FIG. 1 is a cross section taken at a diametric plane through a locking differential mechanism.
Figure 2:
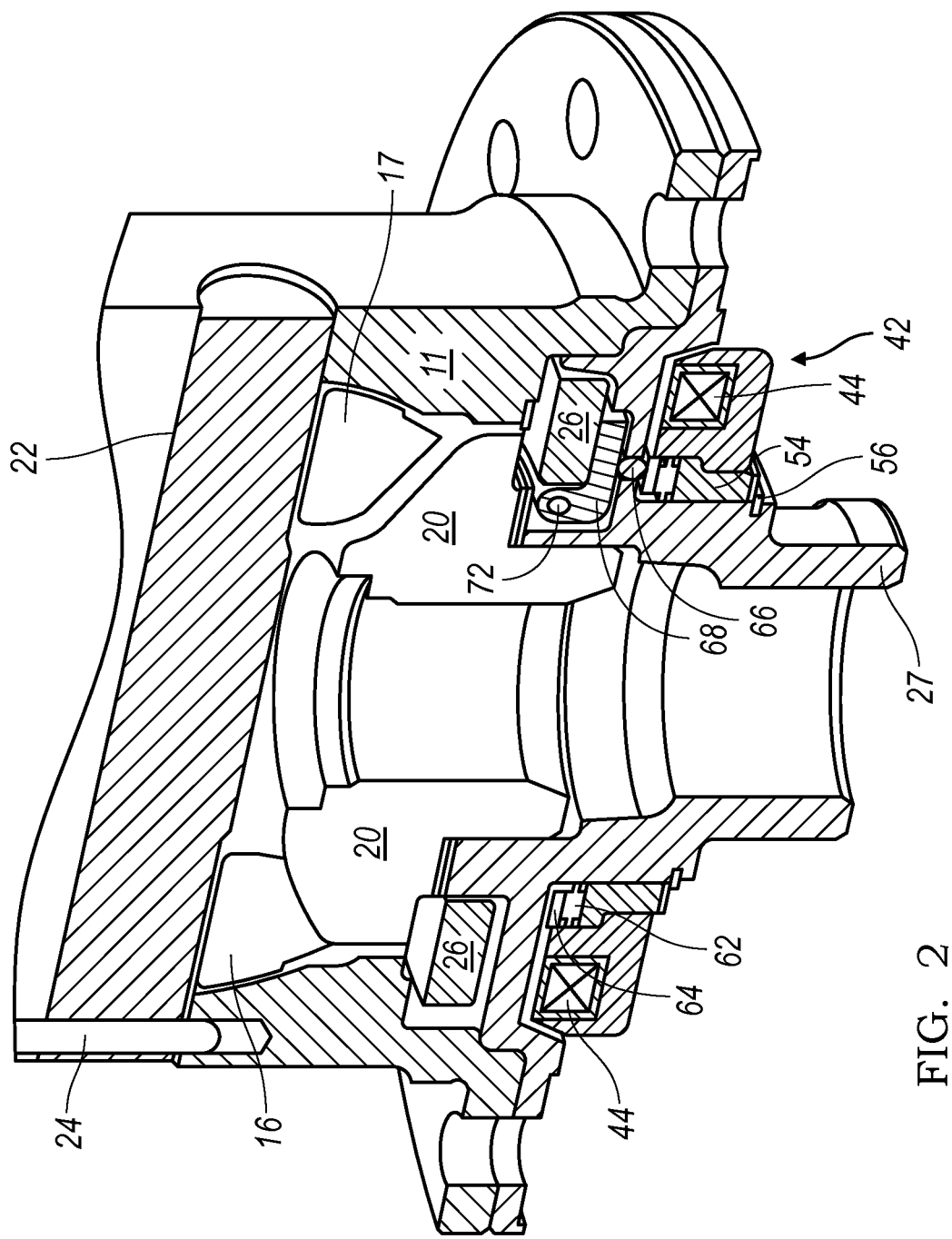
FIG. 2 is an isometric cross section showing the lock ring, side gear and a lever installed at the inner axial face of the end cap.

Referring to FIGS. 1 and 2, a differential mechanism 10 includes a differential case 11, preferably of cast iron or steel, supported on a stationary housing (not shown) for rotation about a lateral axis 12. The case 11 is driveably connected through a bevel ring gear (not shown) to the output of a transmission or transfer case. The ring gear, secured to the case 11 at the attachment bolt holes on a flange 13, is supported for rotation about axis 12.

The case 11 provides an internal chamber 14, which contains bevel pinions 16, 17. Chamber 14 contains a right-side bevel gear 18 meshing with the pinions 16, 17, driveably connected to an output shaft and secured by a spline to side gear 18, which extends laterally at the right-hand side from the case 11 to a driven wheel of a motor vehicle. Chamber 14 contains a left-side bevel gear 20 meshing with the pinions 16, 17, driveably connected to a second output shaft and secured by a spline to side gear 20, which extends laterally from the case 11 at the left-hand side to a driven wheel of the motor vehicle. A spindle 22, is secured by a pin 24 to the rotating case 11, supports the pinions 16, 17 for rotation about the axis of spindle 22 perpendicular to axis 12. The pinions 16, 17 revolve about axis 12.

Figure 3:
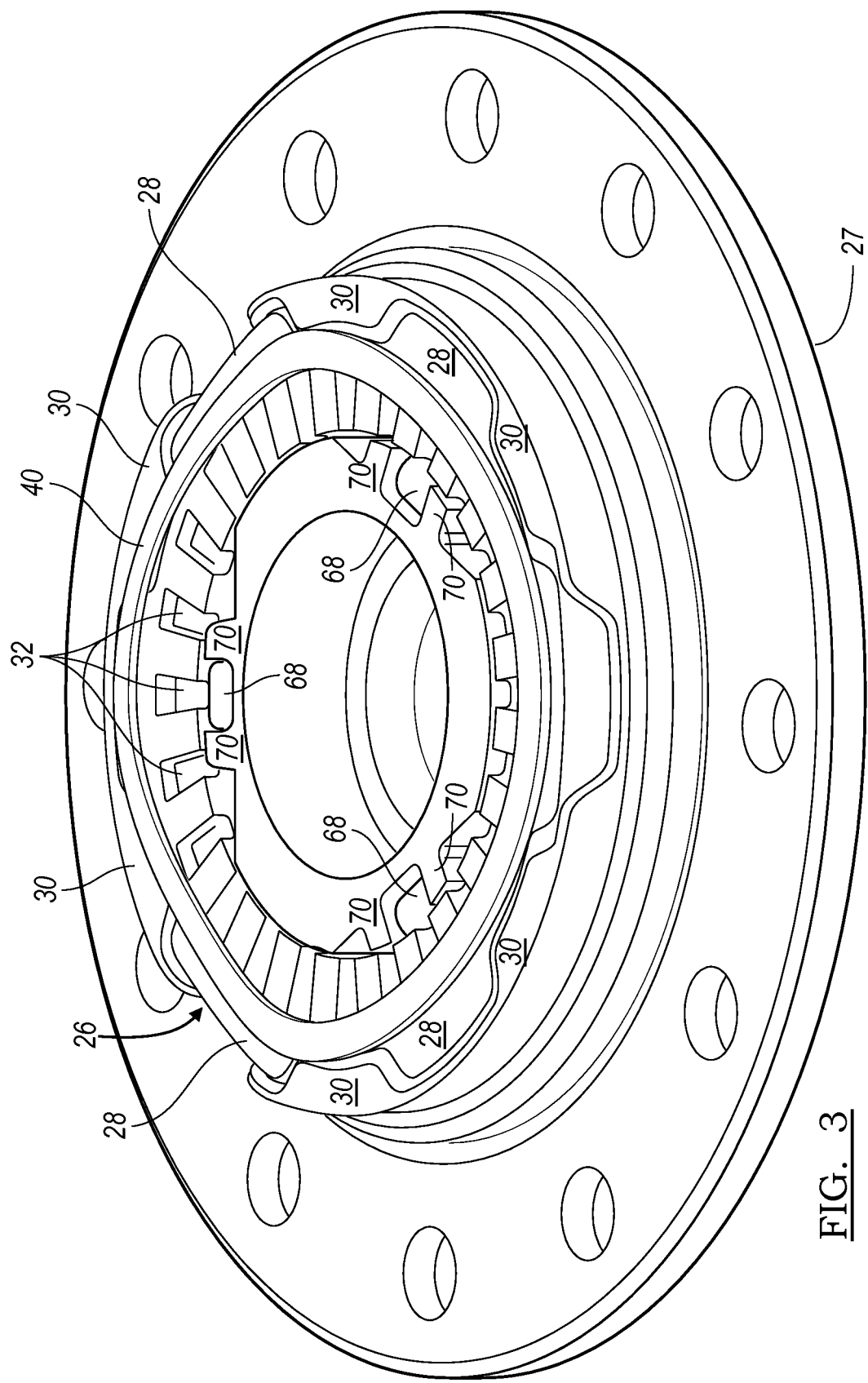
FIG. 3 is an isometric view showing the inboard side of the end cap with the lock ring and return spring installed.
Figure 4:
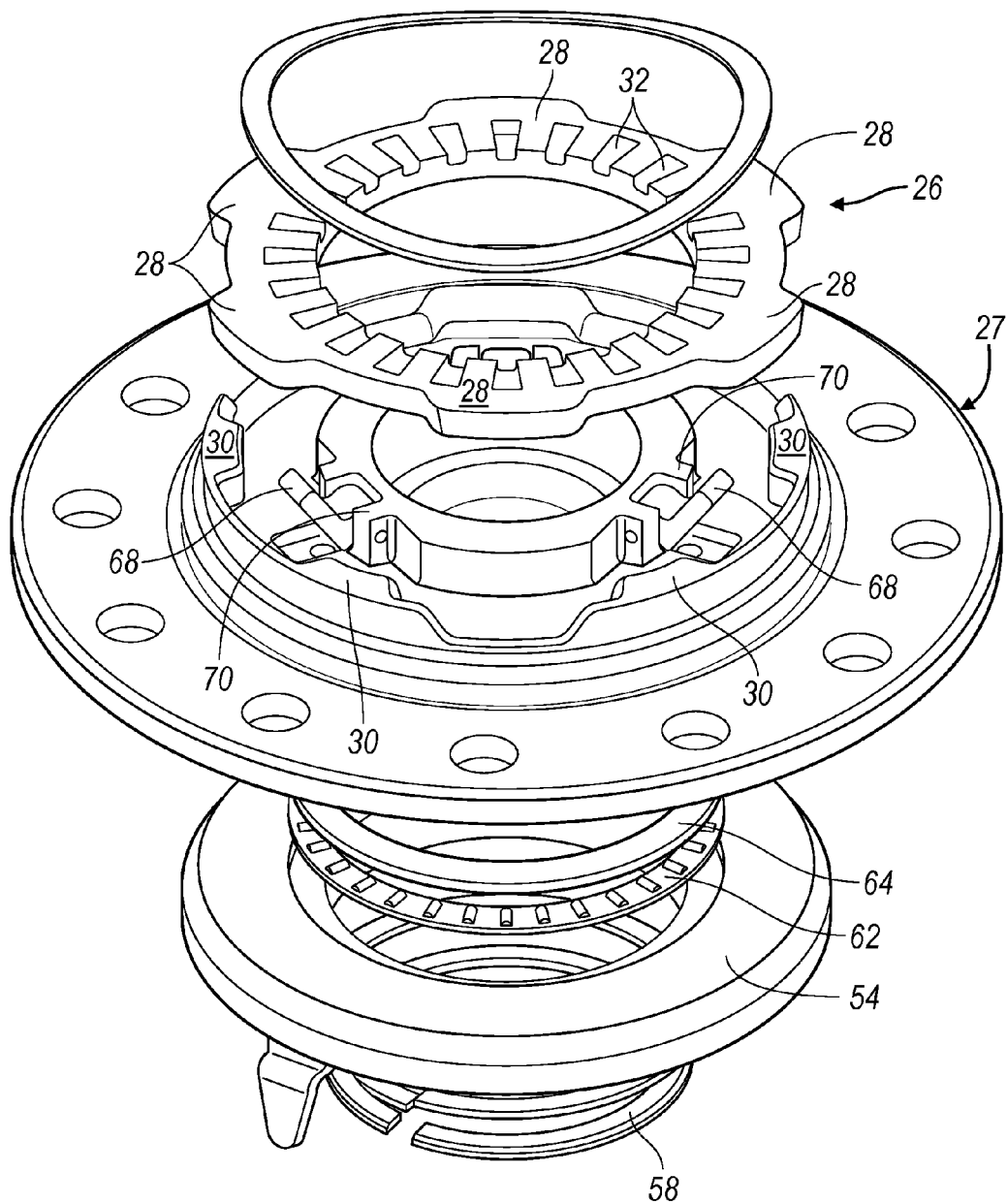
FIG. 4 is an isometric view of the inboard side of the end cap showing the lock ring and return spring in spaced-apart relationship.

Also located in case 11 is a lock ring 26, which rotates with the case 11 about axis 12 due to contact with a differential case end cap 27. FIGS. 3 and 4 show that lock ring 26 is formed with angularly spaced arms 28, each arm extending radially from axis 12 and extending circumferentially between angularly spaced posts 30, formed on an inner surface of the end cap 27. Case 11 is secured to the end cap 27 at attachment holes aligned with those on case flange 13. Contact between the arm 28 and the posts 30 limits or prevents rotation of the lock ring 26 relative to the case 11 and end cap 27. The axial inner or inboard surface of lock ring 26 is formed with a series of angularly spaced clutch recesses 32, which are adjacent and face the axial outer or outboard surface of the side gear 20.

The axial outer surface of side gear 20 is formed with a series of clutch teeth 38 angularly spaced about axis 12, facing and adjacent the clutch recesses 32 of the lock ring 26. The clutch teeth 38 of side gear 20 and the clutch recesses 32 of lock ring 26 are mutually complementary such that they can engage and disengage as the lock ring moves toward and away from the side gear.

The lock ring 26 is normally not engaged with the side gear 20, permitting the side gear to rotate with respect to the differential case 11 and the lock ring, thereby producing an unlocked or disengaged state. When the coil 44 is energized with electric current it moves along axis 12 toward the case 11, actuating lock ring 26 to engage the side gear 20, and causing the clutch teeth 38 and recesses 32 mesh or engage mutually, thereby rotatably connecting the side gear to the lock ring and case 11, preventing the side gear from rotating relative to the case and lock ring, and placing differential 10 in a locked or engaged state. When coil 44 is deenergized, the compression force of an annular Belleville spring 40, located between the case 11 and lock ring 26, forces the lock ring axially away from the side gear 20, thereby returning the differential 10 to the unlocked or disengaged state.

FIGS. 1 and 2 show a coil assembly 42 supported on the case 11 outside chamber 14. The coil assembly 42 includes an electromagnetic coil 44, fitted into an annular recess formed in a ring 48, and a non-magnetic collar 54 press fitted into ring 48. The coil 44 produces a magnetic field when energized with electric current. The magnetic field produces an axial force on the coil assembly 42, whose magnitude varies with the width of an air gap between the coil assembly and the end cap 27.

In operation when the coil 44 is energized, it is attracted to the differential end cap 27 due to the magnetic field generated by the coil. The coil assembly 42 is fixed against rotation with respect to the differential case 11, but it can translate axially toward and away from the differential case. Axial displacement of the coil assembly 42 is transmitted to a collar 54, which is secured to the end cap 27 by a snap ring 58. Collar 54 allows rotation of the differential 10 with respect to the assembly 42 and provides a linear guide for the coil assembly 42 to translate axially.

When the coil 44 is energized, the sliding collar 54 applies an axial force directed rightward to a roller thrust bearing 62 and thrust plate or thrust washer 64. Bearing 62 and thrust plate 64 are located in an annular recess formed in the end cap 27. When coil 44 is energized, thrust plate 64 applies axial force to three angularly spaced balls 66, each ball retained in a hole formed in the end cap 27. As FIGS. 3 and 4 show, three angularly spaced levers 68 are pinned to lugs 70 formed on the end cap 27, each lever located at the angular position of a ball 66.

The mechanism comprising the balls 66 and lever 68 is located axially between the lock ring 26 and the case 11. The levers 68 are actuated by the energized coil assembly 42 moving axially toward case 11 forcing thrust plate 64 against the balls 66, causing the levers 68 to pivot about pivot axes 72.

The outboard end of each lever 68 contacts lock ring 26 as the lever pivots, thereby moving the lock ring clutch recesses 32 into engagement with clutch teeth 38 of the side gear 20. The lock ring 26 moves into mechanical engagement with the side gear 20 to prevent rotation of the side gear relative to the case 11.

Each ball 66 is located at a distance D1 from the lever's pivot axis 72. The lock ring 26 is moved due to contact with the end of the levers 68, which end is located at a distance D2 from the lever rotation axis 72. Axial displacement of the coil assembly 42 due to energizing coil 44 is amplified at the locking ring 28 by the ratio D2/D1. For example, with an initial coil air gap of 1.0 mm and a final air gap of 0.5 mm when the differential 10 is fully locked, the coil 44 moves through a distance of 0.5 mm. Using a ball and lever D2/D1 ratio of 2.3, the lock ring moves through a distance of 1.15 mm.

Figure 5:
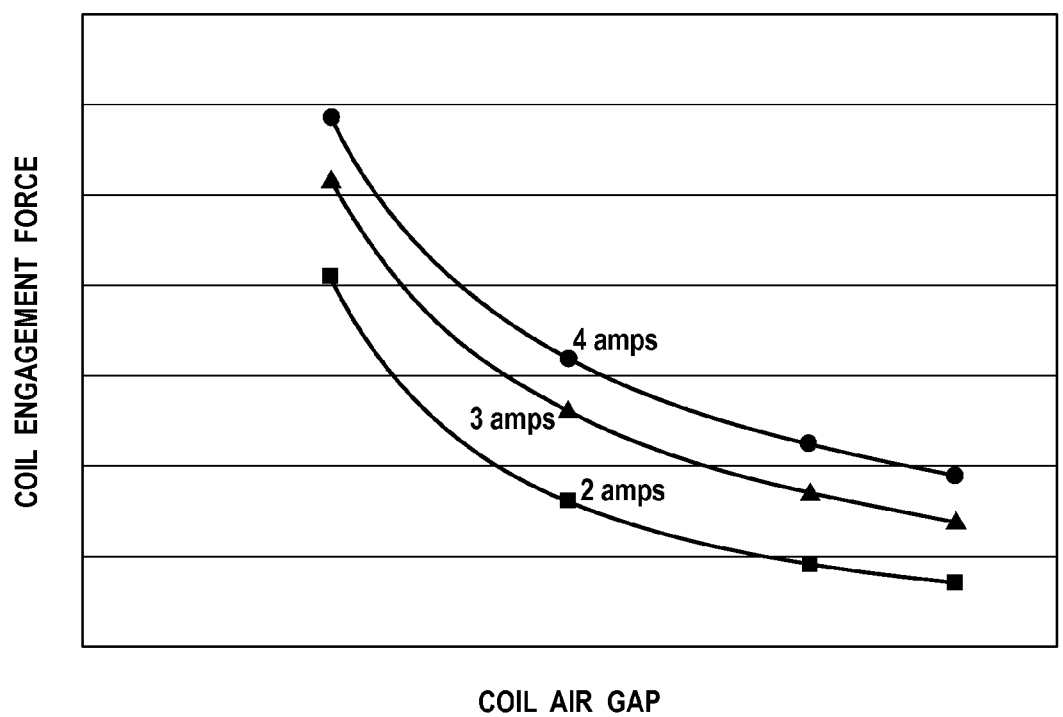
FIG. 5 are graphs showing the non-linear relation between axial force of the coil and air gap for various magnitudes of electric current applied to the coil.

FIG. 5 are graphs showing the non-linear relation between axial force of the coil and air gap for various magnitudes of electric current applied to the coil. For a given coil size it is desirable to keep the initial air gap as small as possible in order to maximize the differential lock force, thereby allowing use of a large return spring, which acts to keep the differential 10 unlocked when the coil 44 is deenergized.

Figure 6:
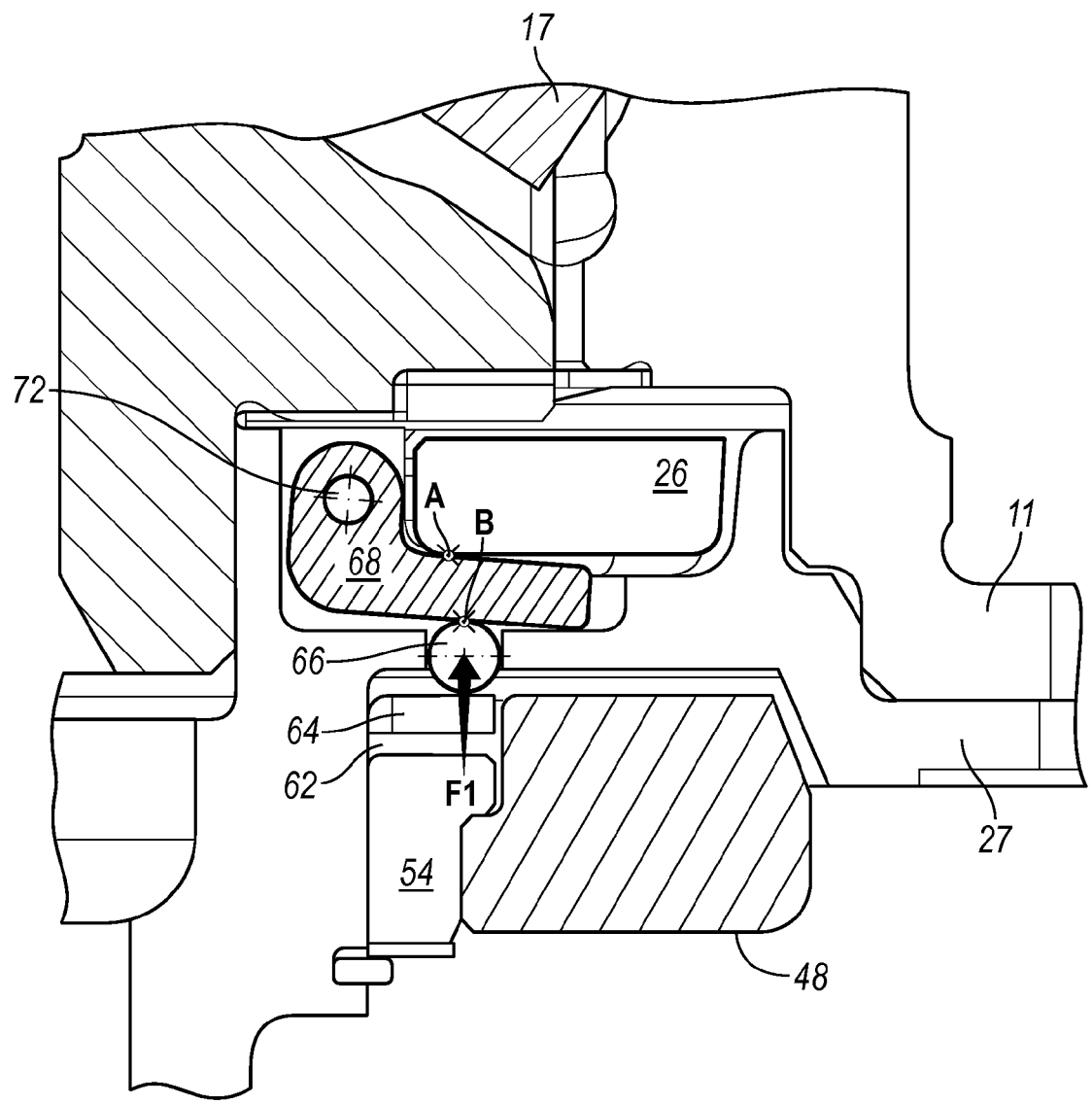
FIG. 6 is a side view showing the lock ring actuating mechanism when the coil is initially energized.

FIG. 6 shows the components of the mechanism for actuating lock ring 26 at a position when coil 44 is initially energized. Lever 68 contacts lock ring 26 at point A, which is closer to pivot point 72 than the point of contact between ball 66 and lever 68 at b point B. Therefore, the force applied to lock ring 26 by lever 66 at A is greater than force F1, which is applied to lever 66 at B by ball 66. This arrangement actuates lock ring 26 with a greater force than the force that is applied to the ball 66 due to energizing coil 44.

Figure 7:
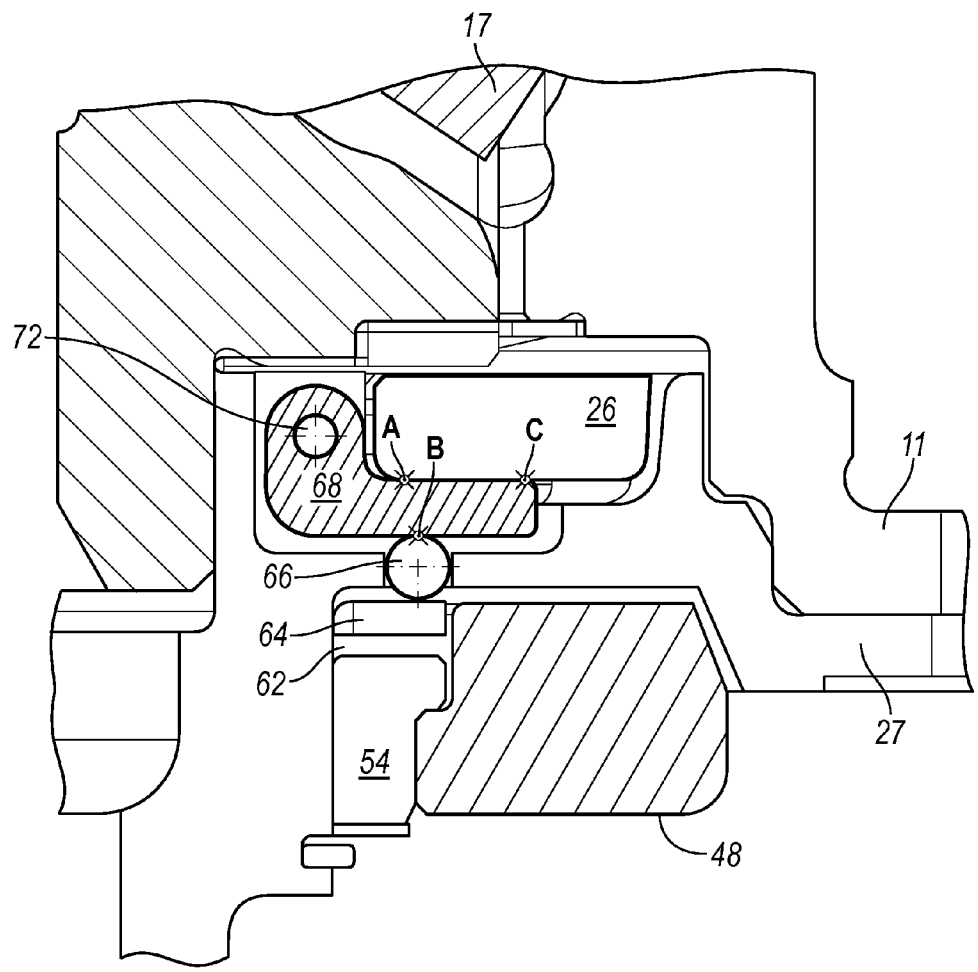
FIG. 7 is a side view showing the lock ring actuating mechanism in an intermediate position later than that of FIG. 6.

FIG. 7 shows the components of the mechanism in an intermediate position later than that of FIG. 6, wherein lever 68 contacts lock ring 26 at contact points A and B. In their positions in FIG. 7, coil 44, ball 66 and lever 68 are in motion. Force applied to lock ring 26 by lever 66 is being transferred from point A to point C as the lever pivots about its pivot axis 72.

A cam profile surface can be formed between contact points A and C on the upper surface of lever 26 or on the lower surface of lock ring 26. The surface profile would match the coil force curve of FIG. 5 and the force-displacement relations of the return spring 40 and provide optimal displacement, engagement time and engagement force of lock ring 26 and electric current draw of the coil 44.

Figure 8:
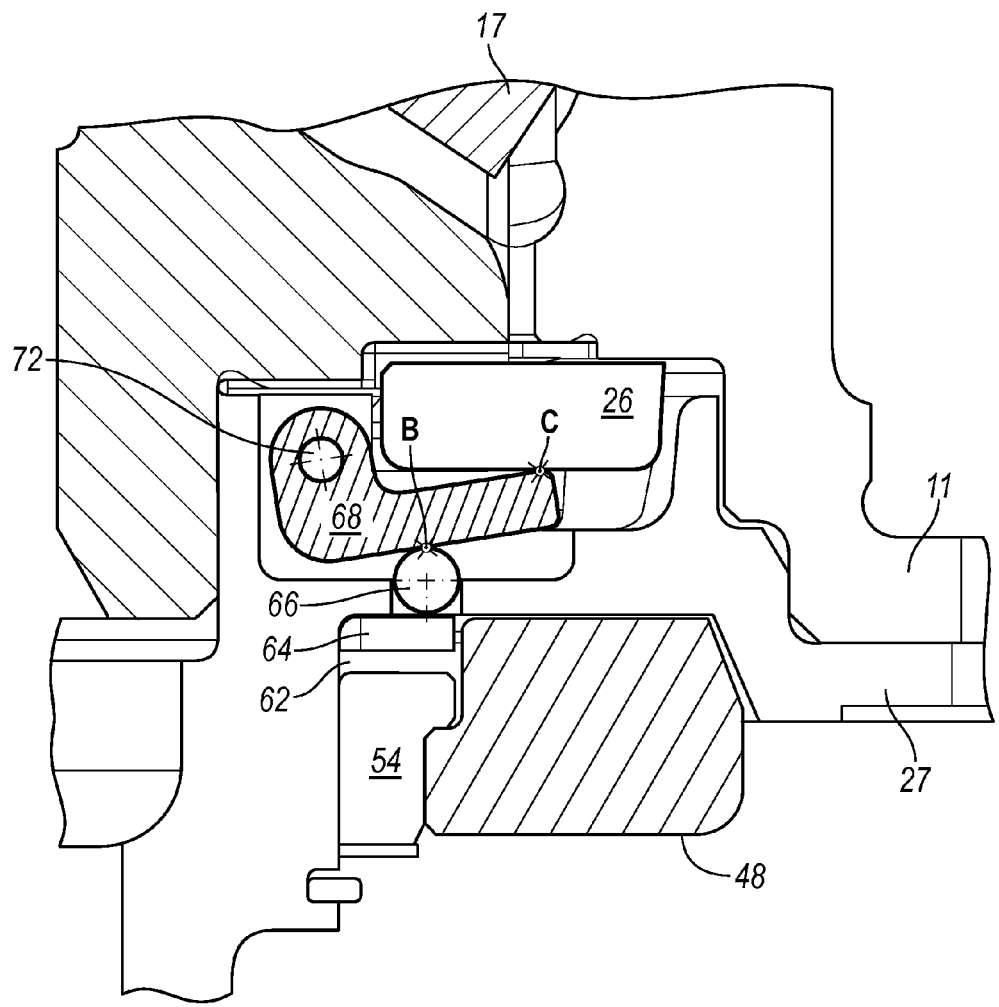
FIG. 8 is a side view showing the lock ring actuating mechanism in a final locked position.

FIG. 8 shows the components of the mechanism in a final locked position later than that of FIG. 7, wherein lever 68 contacts lock ring at contact point C. Axial displacement of lock ring 26 is greater the axial displacement of coil 44 because the lock ring contact point C is further from pivot axis 72 than ball contact point B.

In accordance with the provisions of the patent statutes, the preferred embodiment has been described. However, it should be noted that the alternate embodiments can be practiced otherwise than as specifically illustrated and described.

The invention claimed is:
1. A differential, comprising:
an end cap secured to a case;
a rotatable gear;
a lock ring held against rotation relative to the case;
a lever contacting the lock ring;
an electromagnetic coil displaceable when energized to pivot the lever, engage the lock ring with the gear and prevent rotation of the gear relative to the case;

a ball retained on the end cap, displaceable toward the lever by the coil when energized.

2. The differential of claim 1, wherein:
the lever includes a pivot axis and the lever contacts the lock ring at a first distance from the pivot axis; and
the ball contacting the lever at a second distance from the pivot axis, the second distance being less than the first distance.

3. The differential of claim 1, wherein:
the lever is secured to the end cap at a pivot axis, the lever includes a first surface contacting the lock ring at a first distance from the pivot axis, and a second surface facing away from the lock ring; and
the ball contacting the second surface at a second distance from the pivot axis, the second distance being less than the first distance.

4. The differential of claim 1, wherein:
the lever is secured to the case and includes a pivot axis, a first surface contacting the lock ring at a first distance from the pivot axis, and a second surface facing away from the lock ring; and
the ball contacting the second surface at a second distance from the pivot axis, the second distance being less than the first distance.

5. The differential of claim 1, wherein the coil is spaced from the end cap by an air gap, whose width decreases when the coil is energized.

6. The differential of claim 1, wherein:
the end cap secured to the case and formed with a web that includes an inboard side and an outboard side, the lever and lock ring being located on the inboard side, the coil located on the outboard side.

7. The differential of claim 1, further comprising:
a web that includes an inboard side and an outboard side, the lever and lock ring being located on the inboard side, the coil located on the outboard side.

8. A differential, comprising:
a rotatable gear;
a lock ring held against rotation;
a lever contacting the lock ring;
an electromagnetic coil displaceable when energized to pivot the lever, engage the lock ring with a side gear and prevent the side gear from rotating relative to the lock ring;
a ball spaced radially from an axis, retained in position on an end cap, contacting the lever, and displaceable toward the lever by the coil when energized.

9. The differential of claim 8, wherein:
the lever includes a pivot axis and the lever contacts the lock ring at a first distance from the pivot axis; and
the ball contacting the lever at a second distance from the pivot axis, the second distance being less than the first distance.

10. The differential of claim 8, wherein:
the lever is secured to the end cap at a pivot axis, including a first surface contacting the lock ring at a first distance from the pivot axis, and a second surface facing away from the lock ring; and
the ball contacting the second surface at a second distance from the pivot axis, the second distance being less than the first distance.

11. The differential of claim 8, wherein:
the lever includes a pivot axis, a first surface contacting the lock ring at a first distance from the pivot axis, and a second surface facing away from the lock ring; and
the ball contacting the second surface at a second distance from the pivot axis, the second distance being less than the first distance.

12. The differential of claim 8, further comprising:
a web that includes an inboard side and an outboard side, the lever and lock ring being located on the inboard side, the coil located on the outboard side.

13. A method for locking a differential, comprising:
supporting a gear for rotation;
holding a lock ring against rotation;
placing a lever in contact with the lock ring;
displacing an electromagnetic coil by energizing the electromagnetic coil causing the lever to pivot;
engaging the lock ring with a side gear;
preventing the side gear from rotating relative to the lock ring;
supporting the lever at a pivot axis such that the lever contacts the lock ring at a first distance from the pivot axis; and
placing a ball contacting the lever at a second distance from the pivot axis, the second distance being less than the first distance.

14. A differential, comprising:
a rotatable gear;
a lock ring held against rotation;
a lever including a pivot axis;
a ball;
an electromagnetic coil, the lever contacting the lock ring at a first point spaced a first distance from the pivot axis when the coil is deenergized, the ball contacting the lever at a second point spaced from the pivot axis a second distance greater than the first distance when the coil is deenergized.

15. The differential of claim 14, wherein:
the coil is displaced when energized forcing the ball to pivot the lever and move a point of contact between the lever and the lock ring away from the pivot axis, such that said point of contact becomes spaced from the pivot axis a distance greater than the second distance.

16. The differential of claim 14, wherein:
displacement of the coil when energized pivots the lever, engages the lock ring with the gear and prevents the gear from rotating; and
a surface of one of the lever and the lock ring is formed with a cam profile in a location between the first point and a location of the point of contact when engagement of the lock ring with the gear prevents the gear from rotating.

17. The differential of claim 14, wherein a force applied to the lock ring by the lever is greater than a force applied to the lever by the ball.

18. The differential of claim 14, wherein axial displacement of the lock ring is greater than axial displacement of the coil due to energizing the coil.

* * * * *

UNITED STATES PATENT AND TRADEMARK OFFICE
CERTIFICATE OF CORRECTION

PATENT NO.         : 8,454,471 B2                   Page 1 of 1
APPLICATION NO.    : 12/840338
DATED              : June 4, 2013
INVENTOR(S)        : Dennis W. Isken, II et al.

It is certified that error appears in the above-identified patent and that said Letters Patent is hereby corrected as shown below:

On the title page item (75), line 2, the inventor, "Hihong Guo, Ann Arbor, MI (US)" should read
--Jihong Guo, Ann Arbor, MI (US)--

Signed and Sealed this
Twenty-seventh Day of October, 2015

Michelle K. Lee
*Director of the United States Patent and Trademark Office*